(12) United States Patent
Hamza et al.

(10) Patent No.: US 7,925,117 B2
(45) Date of Patent: Apr. 12, 2011

(54) FUSION OF SENSOR DATA AND SYNTHETIC DATA TO FORM AN INTEGRATED IMAGE

(75) Inventors: Rida M. Hamza, Maple Grove, MN (US); Thea L. Feyereisen, Hudson, WI (US)

(73) Assignee: Honeywell International Inc., Morristown, NJ (US)

( * ) Notice: Subject to any disclaimer, the term of this patent is extended or adjusted under 35 U.S.C. 154(b) by 1188 days.

(21) Appl. No.: 11/475,492

(22) Filed: Jun. 27, 2006

(65) Prior Publication Data
US 2007/0297696 A1    Dec. 27, 2007

(51) Int. Cl.
G06K 9/32    (2006.01)
G06G 7/78    (2006.01)

(52) U.S. Cl. .......................................... 382/294; 701/14
(58) Field of Classification Search .................. 382/103, 382/107, 128, 190, 284, 294; 250/330; 701/4, 701/14; 33/324, 328; 342/29
See application file for complete search history.

(56) References Cited

U.S. PATENT DOCUMENTS

| | | | | |
|---|---|---|---|---|
| 3,216,263 A * | 11/1965 | Culver et al. | | 74/5.46 |
| 4,695,959 A * | 9/1987 | Lees et al. | | 701/225 |
| 5,649,032 A * | 7/1997 | Burt et al. | | 382/284 |
| 6,078,701 A * | 6/2000 | Hsu et al. | | 382/294 |
| 6,289,277 B1 | 9/2001 | Feyereisen et al. | | 701/202 |
| 6,445,832 B1 * | 9/2002 | Lee et al. | | 382/266 |
| 6,456,731 B1 * | 9/2002 | Chiba et al. | | 382/107 |
| 6,512,857 B1 * | 1/2003 | Hsu et al. | | 382/294 |
| 6,749,432 B2 * | 6/2004 | French et al. | | 434/247 |
| 6,765,726 B2 * | 7/2004 | French et al. | | 359/630 |
| 6,841,780 B2 | 1/2005 | Cofer et al. | | 250/341.1 |
| 6,892,118 B1 * | 5/2005 | Feyereisen | | 701/14 |
| 6,934,422 B2 | 8/2005 | Hamza | | 382/293 |
| 7,196,329 B1 * | 3/2007 | Wood et al. | | 250/330 |
| 2001/0038718 A1 | 11/2001 | Kumar et al. | | 382/284 |
| 2003/0078754 A1 | 4/2003 | Hamza | | 702/150 |
| 2003/0118251 A1 | 6/2003 | Hamza | | 382/308 |
| 2003/0132946 A1 * | 7/2003 | Gold | | 345/611 |
| 2003/0185450 A1 * | 10/2003 | Garakani et al. | | 382/232 |
| 2003/0218674 A1 * | 11/2003 | Zhao et al. | | 348/140 |

(Continued)

FOREIGN PATENT DOCUMENTS

EP    0599345 A2    1/1994

(Continued)

OTHER PUBLICATIONS

Goshtasby, A., "Registration of images with geometric distortions", IEEE Transactions on Geosciences and Remote Sensing, vol. 26, No. 1, Jan. 1988.*

(Continued)

Primary Examiner — Bhavesh M Mehta
Assistant Examiner — Tahmina Ansari
(74) Attorney, Agent, or Firm — Ingrassia Fisher & Lorenz, P.C.

(57) ABSTRACT

A system and method for fusing sensor data and synthetic data to form an integrated image are described. An image registration process is used to fuse the images. The image registration process is performed on gradients of a landmark image. The gradients are extracted from both sensor and synthetic datasets for the landmark image. Using the image gradient, a center of mass for each of the gradient's curves is calculated. By solving a minimization problem to reduce error, a desired transformation operator can be obtained to match the sensor image to the synthetic image.

16 Claims, 4 Drawing Sheets

U.S. PATENT DOCUMENTS

| | | | |
|---|---|---|---|
| 2003/0225513 A1 | 12/2003 | Gagvani et al. | 701/211 |
| 2005/0078747 A1 | 4/2005 | Hamza et al. | 375/240.01 |
| 2005/0197981 A1* | 9/2005 | Bingham | 706/20 |
| 2005/0232512 A1* | 10/2005 | Luk et al. | 382/276 |
| 2006/0004275 A1 | 1/2006 | Vija et al. | 600/407 |
| 2006/0186881 A1* | 8/2006 | Tilbrook | 324/248 |
| 2008/0080737 A1* | 4/2008 | Rhoads et al. | 382/100 |

FOREIGN PATENT DOCUMENTS

| | | |
|---|---|---|
| WO | WO 2005/038718 A1 | 4/2005 |

OTHER PUBLICATIONS

Srinivas, et al., "A stochastic model-based approach for simultaneous restoration of multiple misregistered images", SPIE vol. 1360 Visual Communication and Image Processing '90, 1416-1427.*

Zitova et al., "Image registration methods: a survey", Image and Vision Computing 21 (2003) 977-1000.*

Besl et al., "A method for registration of 3-D shapes", IEEE Transactions on Pattern Analysis and Machine Intelligence, vol. 14, No. 2, Feb. 1992.*

Piella, Gemma, "A general framework for multiresolution image fusion: from pixels to regions", Information Fusion 4, 2003, 259-280.*

Habib et al., Linear Features for Semi-Automatic Registration and Change Detection of Multi-Source Imagery, 0-7803-9050-4/05, 2005 IEEE, pp. 2117-2120.

Daneshvar et al., A Hybrid Algorithm for Medical Image Registration, Proceedings of the 2005 IEEE, Engineering in Medicine and Biology 27th Annual Conference, Shanghai, China, Sep. 1-4, 2005, pp. 3272-3275.

Bentoutou et al., An Automatic Image Registration for Applications in Remote Sensing, IEEE Transactions on Geoscience and Remote Sensing, vol. 43, No. 9, Sep. 2005, pp. 2127-2137.

Dai X., A Feature-Based Image Registration Algorithm Using Improved Chain-Code Representation Combined With Invariant Moments, IEEE Transactions on Geoscience and Remote Sensing, vol. 37, No. 5, Sep. 1999, pp. 2351-2362.

Goshtasby et al., A Region-Based Approach to Digital Image Registration With Subpixel Accuracy, IEEE Transactions on Geoscience and Remote Sensing, vol. GE-24, No. 3, May 1986, pp. 390-399.

Flusser et al., A Moment-Based Approach to Registration of Images with Affine Geometric Distortion, 8110 IEEE Transactions on Geoscience and Remote Sensing, 32 No. 2, New York, US, No. 2, Mar. 1994, pp. 382-387.

EP Search Report, 07111109.0 dated Feb. 18, 2008.

Adelson et al., "Pyramid Methods in Image Processing," RCA Engineer, vol. 29(6), Nov./Dec. 1984, pp. 33-41.

DeCastro et al., "Registration of Translated and Rotated Images Using Finite Fourier Transforms," IEEE Transactions on Pattern Analysis and Machine Intelligence, vol. 9, No. 5, pp. 700-703. Sep. 1987.

Eddy et al., "Improved Image Registration by Using Fourier Interpolation," Magnetic Resonance in Medicine, vol. 36, No. 6, pp. 923-931, Dec. 1996.

Kostelec et al., "Multiresolution Elastic Image Registration," Medical Physics, vol. 25, No. 9, pp. 1593-1604, Sep. 1998.

Negahdaripour et al., "A Generalized Brightness Change Model for Computing Optical Flow," Fourth International Conference on Computer Vision, pp. 2-11, Berlin, Germany, May, 1993.

Periaswamy et al., "Medical Image Registration with Partial Data," Preprint Submitted to Elsevier Science, Mar. 11, 2005.

Periaswamy et al., "Automated Multiscale Elastic Image Registration Using Correlation," Proceedings of SPIE, The International Society for Optical Engineering, vol. 3661, pp. 828-838, Feb. 1999.

Shih et al, "Contour-Model-Guided Nonlinear Deformation Model for Inter-subject Image Registration," Proceedings of SPIE, The International Society for Optical Engineering, vol. 3034, pp. 611-620, Apr. 1997.

Shi et al., "Good Features to Track," IEEE Computer Society Conference on Computer Vision and Pattern Recognition, pp. 593-600, Jun. 1994.

West et al., "Comparison and Evaluation of Retrospective Intermodality Image Registration Techniques," Proceedings of SPIE, vol. 2710, pp. 332-347.

Viola et al., "Alignment by Maximization of Mutual Information," IEEE Fifth International Conference on Computer Vision, pp. 16-23, Cambridge, MA, USA, Jun. 1995.

Watson et al., "A Look at Motion in the Frequency Domain," pp. 1-10, ACM, Apr. 1983.

F. Samadzadegan, "Fusion Techniques in Remote Sensing," Univ of Tehran, http://www.igf.uni-osnabrueck.de/mitarbeiter/schiewe/papers/43.pdf.

Yang, et al, "Image Fusion Using the Expectation-Maximization Algorithm and a Hidden Markov Model," *Lehigh University*.

Jennings et al., "Synthetic Vision as an Integrated Element of an Enhanced Vision System," Proceedings of SPIE, vol. 4713, pp. 10-17, Apr. 2002.

Judge et al, "Solutions that Permit Safer Flight in Degraded Visual Environments (DVE)," AHS, $60^{th}$ Annual Forum Proceedings, pp. 2174-2180, Jun. 2004.

Foyle et al, "Enhanced/Synthetic Vision Systems: Human Factors Research and Implications for Future Systems," SAE Transactions: Journal of Aerospace, 101, pp. 1734-1741, 1992.

Burt, et al, "Enhanced Image Capture Through Fusion," David Sarnoff Research Center, Princeton, NJ, published in 1993 IEEE transactions. Feb. 1993 MMWAVE.

Takács, et al, "Real-time Visualization Using a 2D/3D Imaging MMWAVE Radar," *Real-Time Imaging VIII (E113)*, *SPIE Electronic Imaging*, Jan. 18-22, 2004, San Jose, CA.

Rockwell Collins, "Total Precision. For Every Mission," http://www.rockwellcollins.com/products/gov/prn_flight2safety.html printed Mar. 26, 2006.

Rockwell Collins, "Technology Solutions to Enable Safe, Efficient and Effective Flight Operations Under All Conditions," http://www.rockwellcollins.com/about/innovation/atc/prn_page4332.html printed Mar. 26, 2006.

Pope, Steven, "NASA Partners Show EVS, SVS Concepts," Nov. 2005, http://www.ainonline.com/Issues/11_05/11_05_nasa_96.htm.

Bad Visibility Not a Problem with Synthetic Vision System, http://www.honeywell.com/sites/portal?smap=aero &page=aerotechmagazine3&theme-T4 printed Mar. 9, 2006.

"Advanced Vision Cueing and Control (AVC2)" http://www.honeywell.com/sites/aero/technology/avionics3_CA0A2F626-AEE9-48de-12E printed Mar. 9, 2006.

AeroTech Magazine, Synthetic Vision System, vol. 1; Issue 1, 2006. www.honeywell.com.

Gulfstream G350, G450, G500 and G550, Gulfstream PlaneView Advanced Cockpit, Sep. 2004.

"Rockwell Collins Completes Successful SE-Vision Test Flights" Jul. 20, 2005.

* cited by examiner

FUSION OF SENSOR DATA AND SYNTHETIC DATA TO FORM AN INTEGRATED IMAGE

FIELD

The present invention relates generally to providing guidance to vehicle operators, and more particularly, relates to forming a combined sensor and synthetic image that provides guidance to vehicle operators in limited or no visibility conditions.

BACKGROUND

Ideally, a pilot or other vehicle operator can see the external environment as they maneuver their vehicle. However, in some circumstances, a vehicle operator needs to operate his vehicle when visibility is poor. Sensors may be used to aid the vehicle operator in these conditions. For example, an aircraft may include infrared (IR) sensors and millimeter-wave (MMW) sensors, which may be used in conjunction with video cameras (typically operating at other wavelengths, including the visible band), to provide the pilot with a computer-generated view of the external environment. While helpful, the sensor data may be limited by field of view, range, the limited two-dimensional flat view, and operational response problems related to weather conditions or other obscurants.

Synthetic data from a database may also be used to provide a vision of the external environment to a vehicle operator. A synthetic image database includes previously obtained images of the terrain indexed by Global Positioning System (GPS) data, other navigation solution data, and/or other available datasets. A Synthetic Vision System (SVS) may construct a particular view of the world from the database based on the vehicle's location, map the information into a three-dimensional image, and display the constructed image to the vehicle operator.

The image shown to the vehicle operator may depict the terrain in the location of the vehicle, in a photorealistic display, similar to a three dimensional (3D) picture used in video games. Thus, the vehicle operator may be able to envision the terrain, including obstacles, without actually seeing the external environment. For example, a pilot using the SVS may see a 3D image of an approach path and runway during landing.

However, the SVS is limited to the datasets stored in the synthetic image database. The synthetic image database may not be complete or may include erroneous data points. Additionally, the synthetic datasets do not include dynamic variables. As a result, the SVS does not display images showing real-time wildlife, vehicles, or other changed conditions since the data in the database was obtained.

Previous attempts to fuse sensor and synthetic data to form an integrated image have failed. The difficulty is in positioning the two images so that the features in the images are aligned. If the two images are not aligned, the resulting image may actually confuse a vehicle operator instead of providing guidance.

Thus, it would be beneficial to fuse the sensor data with the synthetic data into a single integrated image. The integrated image may be provided to vehicle operators in low or no visibility conditions, allowing for safer vehicle operation in these poor conditions.

SUMMARY

A method and system for fusing sensor data and synthetic data to form an integrated image is described. The fusion method includes identifying at least two landmarks, extracting an image gradient from a sensor image dataset for each of the at least two landmarks, extracting a corresponding image gradient from a synthetic image dataset (or, based on availability, directly extract synthetic edges from the synthetic database) for each of the at least two landmarks, calculating a center of mass for each of the image gradients extracted from the sensor and synthetic image datasets, calculating displacement between corresponding image gradients from the sensor and synthetic image datasets centered at the calculated centers of mass; and stabilizing images by minimizing the displacement to form the integrated image.

In one example, calculating displacement includes calculating a displacement vector that represents space shifting and rotation between the corresponding extracted image gradients. The rotation may be estimated using a rotation matrix or an average of two rotation angles.

In another example, calculating displacement includes estimating an orientation of an image as a function of a line that coincides on the centers of mass for the at least two landmarks. In yet another example, calculating displacement includes using a geometric transformation that is applied rigidly between the sensor and synthetic image datasets and a curve fitting model in a region between the at least two landmarks.

In one example, stabilizing images includes minimizing a least mean square error between centers of mass for corresponding image gradients. In another example, stabilizing images includes minimizing a least mean square error between corresponding image gradients.

A system for combining sensor data and synthetic data to form an integrated image is also described. The system includes a synthetic vision system that receives the synthetic data from a database; a sensor fusion function that receives the sensor data and combines the sensor data if the sensor data originates from more than one sensor; an image warping function that receives the synthetic data from the synthetic vision system and the sensor data from the sensor fusion function; wherein the image warping function maps the synthetic data into sensor data coordinates; an image registration function that receives an output from the image warping function and extracts corresponding features from the sensor data and synthetic data, wherein the image registration function matches the extracted features; and an image fusion function that receives the matched features from the image registration function and generates pixel values based on a weighted average between the two-image sources. The weights may be normalized to provide the largest contrast possible and may be tuned based upon user choice of setting to weigh either source of information.

The sensor fusion function may perform a selective spatial distribution of MMW sensor data and a multi-resolution analysis on other received sensor data. The image fusion function may use linear superposition to determine a percentage of sensor data and synthetic data to be presented in the integrated image. The image fusion function may also warp pixel values of the synthetic data into a sensor reference if there is any local displacement of objects within images. The system may further include a symbol generator that overlays symbology on the integrated image.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

Figure 1:
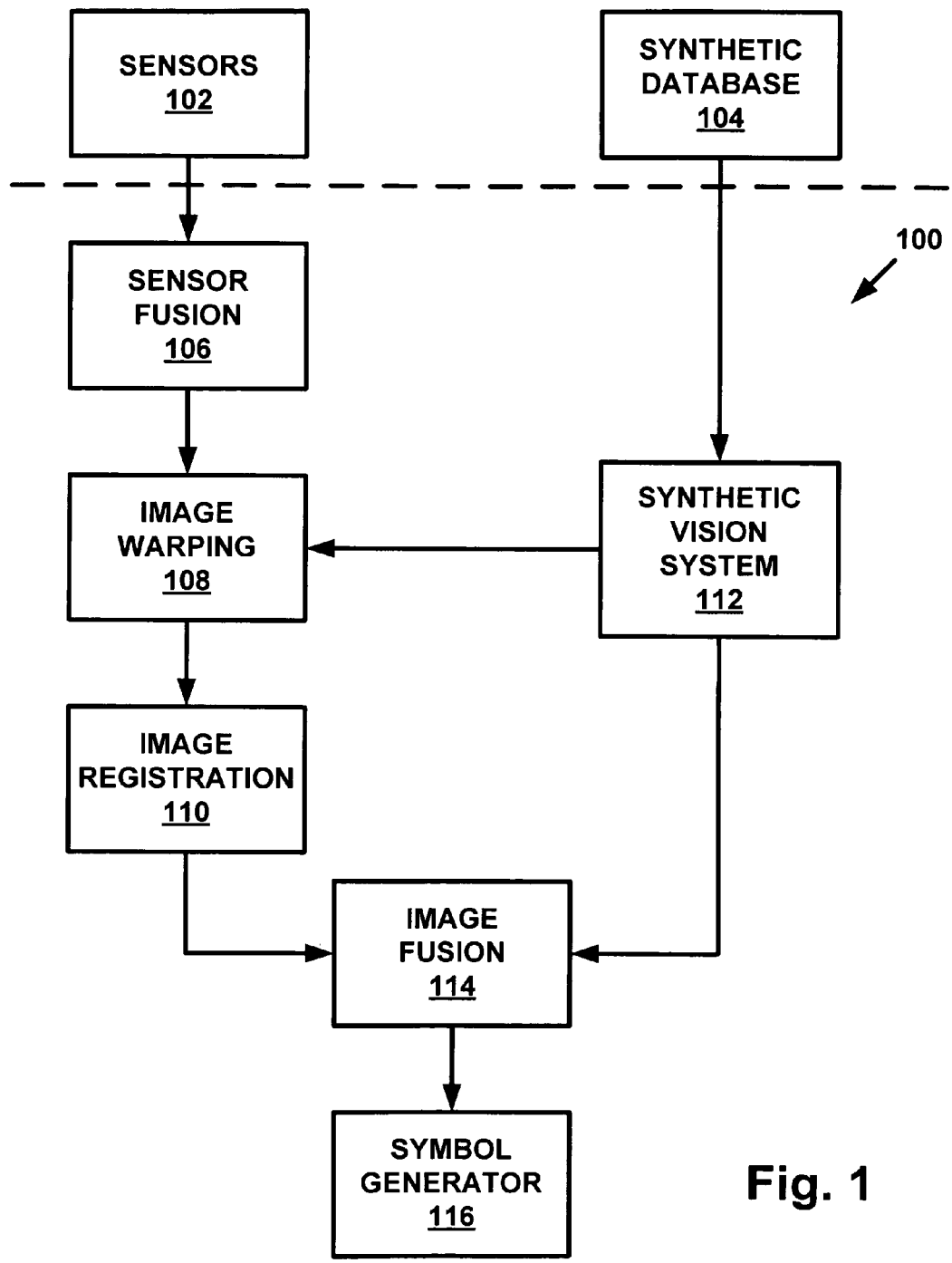
FIG. 1 shows a block diagram of a system for combining sensor data and synthetic data to form an integrated image, according to an example.

FIG. 1 shows a block diagram of a system 100 for fusing sensor data and synthetic data to form an integrated image. The system 100 may include any combination of hardware, software, and/or firmware to form a three-dimensional integrated model for which a two-dimensional image can be extracted. Preferably, the system 100 is a computer unit that has been programmed to process the sensor and synthetic data as described herein. The computer unit may be a commercial off-the-shelf (COTS) computing device or a custom designed computing device. The system 100 may also include additional features, such as a display for presenting the integrated image, memory for storing data and executable programs, and a user interface for allowing a vehicle operator to control the operation of the system 100. For example, the display may be a head-up display (HUD) or a head-down display (HDD).

The system 100 receives inputs from at least one sensor 102 and from a synthetic database 104. The synthetic database 104 is a database that stores data indexed by geographical location. The data may be modeled and stored in the synthetic database 104 as a one dimensional (pixel), two dimensional, or three dimensional image. A synthetic vision system 112 retrieves images from the synthetic database 104 based on the vehicle's position as determined by GPS (or other navigation solution) and generates a three-dimensional picture of the terrain, similar to the scenery generated by some video games. The synthetic vision system 112 may also include an integrity-monitoring system to ensure that the retrieved image corresponds to the actual vehicle position.

The sensors 102 may include a visible sensor, such as a video camera; a long and/or short wave infrared (IR) sensor; and/or a millimeter-wave (MMW) sensor. Other sensors may also be available to provide data to the system 100. The sensors 102 may provide a raster image output to the system 100.

It may be beneficial to receive data from more than one sensor 102. For example, a long wave IR sensor may be preferable for obtaining terrain features, while a short wave IR sensor may be preferable for obtaining a runway outline. If more than one sensor 102 provides data to the system 100, the sensor data is combined or fused using a sensor fusion function 106. By fusing the data from multiple sensors with the sensor fusion function 106, the resulting image may include benefits from each type of sensor used.

The sensor fusion function 106 is used to fuse sensor data because raw images from each of the sensors may have a different resolution. Additionally, because the sensors 102 are located on a moving vehicle, the sensors 102 vibrate and produce non-stationary images that do not match from one image to another. The sensor fusion function 106 may use a custom designed stabilization method, such as a Scale Invariant Feature Transform. Alternatively, the sensor fusion function 106 may use a COTS technique, using raw pixels to stabilize sensor images, to fuse the pixel values from different sensor sources after stabilization of the images. For example, the sensor fusion function 106 may perform a multi-resolution analysis on the received sensor data.

To perform the multi-resolution analysis, the sensor fusion function 106 may implement nonlinear fusion algorithms using, for example, image pyramids or wavelet analysis to form a combined representation. For example, nonlinear image algebra operators may be used to fuse IR images as follows:

$$I_{IR+visible}(x,y) = \text{Max}((1-I_{IR}(x,y))+\text{Gray}(I_{Visible}(x,y))). \quad \text{(Equation 1)}$$

Using Equation 1, the IR image is reversed in color to match the visible color pattern, as hot and/or dense areas are usually presented with bright pixels.

For example, daylight sky pixels are usually sensed in dark pixels in the IR image because of the heat dispersion in the sky, even though the sky should be a lighter color in color images. As another example, the runway is typically captured as the brightest area in the IR image; however, in reality the runway usually has a dark concrete color. For these reasons, the sensor fusion function 106 reverses the IR pixels and converts color images into a gray scale for consistency. The Gray function in Equation 1 converts the color image to the grayscale image by eliminating hue and saturation information, while retaining luminance information.

As another example, for visible sensors, the sensor fusion function 106 may use color transfer to merge color bands appropriately and convert the resulting output back into the color domain as follows:

$$I_{IR+color}(x,y) = Rgb(I_{IR+visible}(x,y)). \quad \text{(Equation 2)}$$

Additionally, the sensor fusion function 106 may treat MMW imagery as Markov random fields, which may be applied selectively in some regions and excluded in others to limit the noise ratio in the resulting fused image. The selection may be executed at multi-resolution. The use of a Markovian model and the exclusion of MMW in some areas of the image is a result of the MMW image having a low image quality and noisy background, while providing reliable instant readouts that may be detected with other types of sensors.

The MMW input image is modeled as Markov random field to define an energy function that describes the contribution of the fused image with predefined regions of interest (ROI) within the image. The ROI are landmarks that the vehicle operator may be interested in seeing. For example, if the vehicle operator is a pilot of an aircraft, the ROI may be the horizon, the runway, and any tall structures.

According to the local characteristics of Markov random fields, a joint probability of a hidden random field of the actual sensed information and an observable random field (i.e., the observed image) may be determined. The observable random variables may have the following density function:

$$P_{IR}(x, y/(\tilde{x}, \tilde{y}), F_{ROI}) = \sum_k f(x, y; F_{ROI}) P(k/F_{ROI}) \quad \text{(Equation 3)}$$

where the point $(\tilde{x}, \tilde{y})$ is the hidden random field, assuming values in a finite state space with some probability distributions. The measured value (x, y) is the observable random field. The parameter set $F_{ROI}$ is the ROI neighborhood configuration. The $f(x,y;F_{ROI})$ may be defined as Gaussian emission distribution or any predefined distribution function that simulates the actual pixel readouts. Assuming that the random variable vectors are independent of each other within an ROI, then $P(k/F_{ROI})$ becomes a constant $\omega_k$ and the observable density function becomes a weighted average of the distribution functions.

$$I_{Fused}(x, y) = \begin{cases} I_{IR+color}(x, y) + I_{mmw}(x, y); & \text{for } (x, y) \in ROIs \\ I_{IR+color}(x, y); & \text{otherwise} \end{cases} \quad \text{(Equation 4)}$$

An output of the sensor fusion function 106 is provided to an image warping function 108. Image warping is generally understood to be a process that manipulates an image that involves transformation of pixel distribution to a different arrangement, which may result in orientation, stretching, and interpolation. The image warping function 108 may map synthetic coordinates into sensor coordinates. Alternatively, there may be instances in which the sensor coordinates are mapped into synthetic coordinates, for example, if there is a known issue with lens properties of a sensor.

To map the synthetic coordinates into sensor coordinates, the image warping function 108 may use any warping technique. For example, the image warping function 108 may use the commonly known Fant two-pass process or the process described in U.S. Pat. No. 6,934,422 assigned to the same assignee as the current application. U.S. Pat. No. 6,934,422 is hereby incorporated by reference in its entirety.

An output of the warping function 108 is provided to an image registration function 110. Image registration is generally understood to be a process of transforming different sets of image data into one coordinate system. Prior to image registration, the sensor ROI and synthetic ROI do not match. As a result, without registering the images, the combination of the two images may confuse a vehicle operator, who may see an overlapping "double image" and not know which image to believe.

The image registration function 110 provides real-time linear shifting and rotation on predefined ROI. As described with reference to FIGS. 2-7, the image registration function 110 simplifies a rigid registration transformation by operating on gradients of the landmark, then mapping the gradients to a central point, which is a center of mass of the gradient's curves. The image registration function 110 is described using the example of a pilot navigating an aircraft, but it is understood that the image registration function 110 is suitable for a variety of vehicles, such as unmanned aircraft, land vehicles, boats, and submarines.

Figure 2:
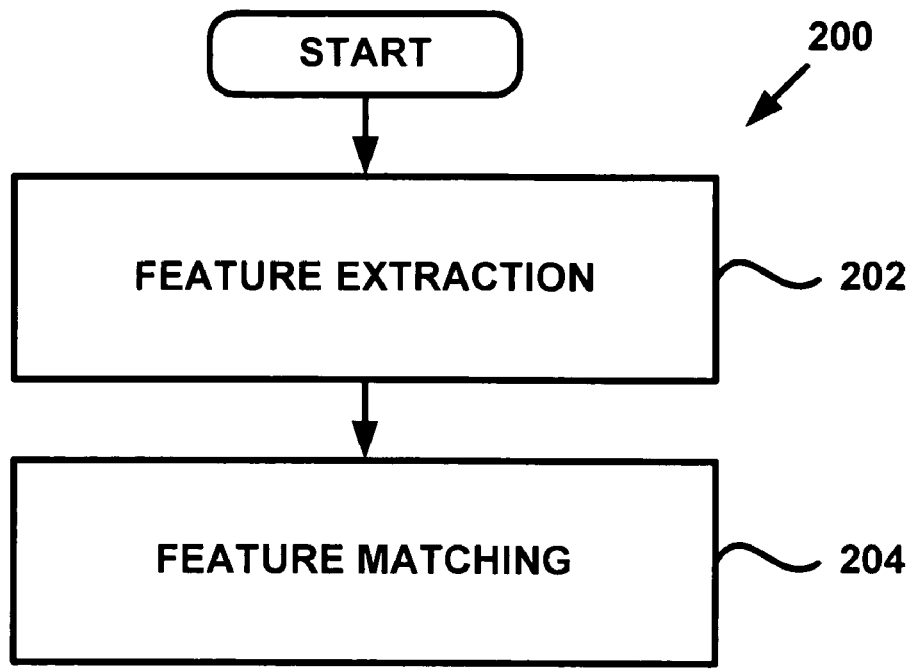
FIG. 2 is a flowchart of a method for image registration, according to an example.

FIG. 2 is a flowchart of a method 200 for image registration. As seen in FIG. 2, the image registration function 110 extracts features at block 202 and matches the extracted features at block 204. At block 202, the image registration function 110 extracts a corresponding number of landmarks or features between the two image datasets (i.e., sensor and synthetic). Typically, two ROI are extracted. For example, two points on a horizon may be extracted from the two datasets.

The image registration function 110 may operate on gradients of the ROI defined as $\nabla_{c_i}$, $\nabla_{\tilde{c}_i}$, (gradients of the synthetic image and sensor image, respectively). The gradients $\nabla_{c_i}$, $\nabla_{\tilde{c}_i}$, may be used because there is no raw pixel correlation between the synthetic image and the sensor image. Alternatively, the ROI may be considered as a surface, a corner, an edge, or an approximated shape (e.g., a trapezoid for runway shapes) defined by an intensity distribution of pixel values, or any other image property so long as the image registration function 110 can determine a center of mass of the ROI. For example, the edges of the synthetic images may be known and can be read directly from a database without further processing.

Figure 3:
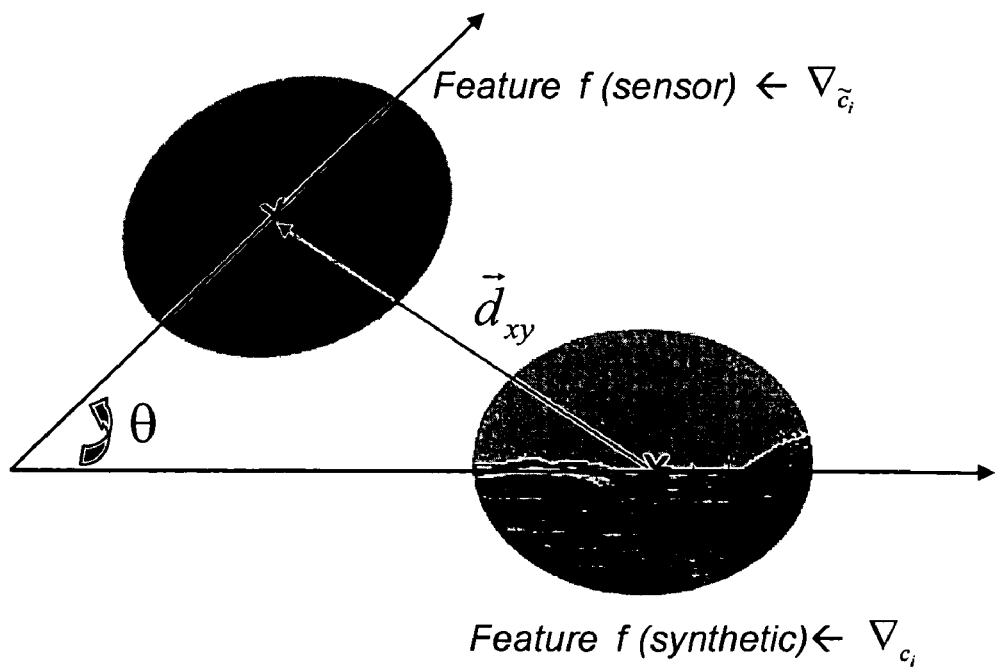
FIGS. 3-6 are graphs for explaining the method for image registration depicted in FIG. 2, according to an example.

As shown in FIG. 3, the image registration function 110 extracts the features' correlation among their gradients' center of mass by computing space shifting and orientation angle in the synthetic domain. A displacement vector $\overline{d}_{xy}$ includes not only the displacement of the feature vector from synthetic to sensor domain, but also the displacement due to offset axis orientation of ROI with respect to the actual center of the orientation, i.e., the image center.

A pre-estimate of the center of mass of the gradient for both the sensor ROI and the synthetic ROI is calculated. The center of mass may be defined by the following equation:

$$C(\hat{x}_0, \hat{y}_0) = \left[\frac{m_x}{M}, \frac{m_y}{M}\right] \quad \text{(Equation 5)}$$

where M is the mass within the feature vector (i.e., gradient curve), and the moments of mass on both axes are:

$$m_x = \int_R \int \rho(x, y) y \, dx \, dy \quad \text{(Equation 6)}$$

$$m_y = \int_R \int \rho(x, y) x \, dx \, dy. \quad \text{(Equation 7)}$$

The image registration function 110 determines template matching parameters by minimizing a least mean square error between both templates as follows:

$$\min e = \|\mathfrak{R}_\theta C(\hat{x}_0, \hat{y}_0) + \overline{d}_{xy} - \tilde{C}(\hat{x}_0, \hat{y}_0)\|^2. \quad \text{(Equation 8)}$$

Alternatively, the least mean square error may be exercised on the entire feature vector rather than on the mass center by using a set of pixels that cover the feature vector within the ROI. The values for these feature pixels may be computed from the gradient or be interpolated intensity values of the feature template.

At block 204, the image registration function 110 (which may also be referred to as an image stabilization function) matches the extracted features. In one example, the method 200 uses localized feature mapping. Assuming a plane image with rigid movements of translation and rotation, the image registration function 110 may approximate the image matching using a rigid mapping transformation. The synthetic domain may be used as a referenced field. The image within two predefined ROI may be defined by a density function vanishing outside the ROI, whose position varies with time in the sensor domain, but is constrained inside the observed field for each ROI.

Figure 4:
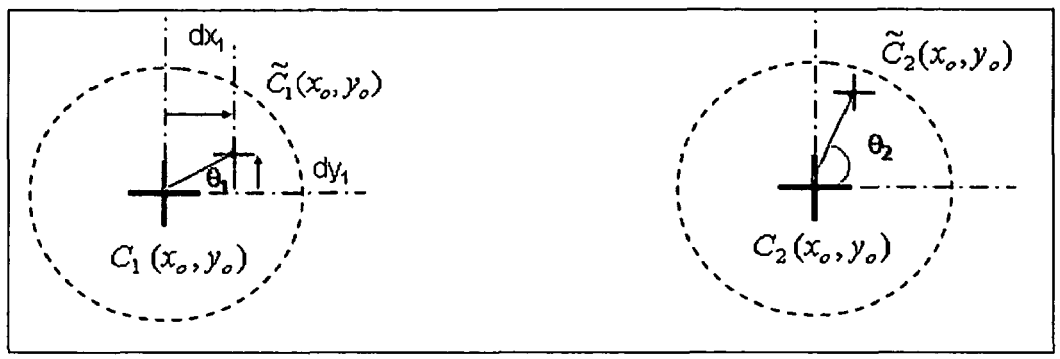

FIG. 4 depicts two ROI in which each ROI exhibits a certain rotation and linear shifting in both directions as presented by the vector. In this localized feature mapping example, each ROI is treated separately, but forced into a least square solution to estimate a common rotational matrix for mapping the ROI. The image registration function 110 determines the registration parameters by minimizing a least mean square error between the two feature vectors applied for each ROI using the following approximation.

For example, if:

$$\begin{cases} \nabla_{c_1} = \mathcal{R}_\theta \nabla_{\tilde{c}_1} + \vec{\bar{d}}_{xy} \\ \nabla_{c_2} = \mathcal{R}_\theta \nabla_{\tilde{c}_2} + \vec{\bar{d}}_{xy} \end{cases} \quad \text{(Equation 9)}$$

where $$\vec{\bar{d}}_{xy} = (\vec{d}_{xy1} + \vec{d}_{xy2})/2$$

is the mean value of the displacement vector, and assuming that the registration is based on a rigid transformation, the ROI may be defined by a similar rotational map.

By combining both equations, (i.e., $[\nabla_{c_1}, \nabla_{c_2}] = \mathcal{R}_\theta [\nabla_{\tilde{c}_1}, \nabla_{\tilde{c}_2}] + \vec{\bar{d}}_{xy}$) and assuming the image registration function 110 uses almost the same rotation matrix to express the mapping features as formulated in Equation 9. The rotation matrix can be estimated, in a least square sense, as:

$$\mathcal{R}_\theta = \left[ \nabla_c - \vec{\bar{d}}_{xy} \right] \nabla_{\tilde{c}}^T [\nabla_{\tilde{c}} \nabla_{\tilde{c}}^T]^{-1}. \quad \text{(Equation 10)}$$

Alternatively, the image registration function 110 can estimate the overall rigid rotation of the sensor image as an average of the two rotation angles of the ROI measured separately as:

$$\mathcal{R}_{\theta i}/\theta_i = \arctan\left(\frac{\Delta d_y}{\Delta d_x}\right). \quad \text{(Equation 11)}$$

Equations 10 and 11 should converge to the same results.

Figure 5:
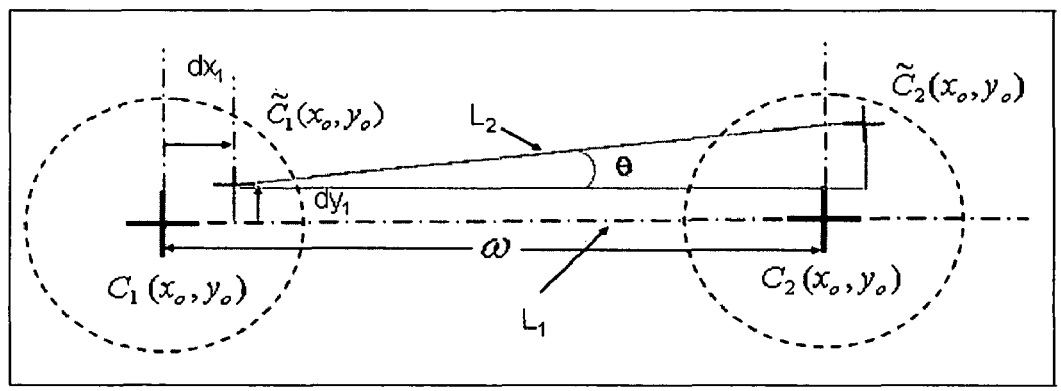

In another example of matching the extracted features, the method 200 uses a global feature mapping technique. In this example, the image registration function 110 calculates an estimate of orientation that aligns the mass centers for both ROIs by estimating the orientation of the image as a function of the drifted linear line that coincides on both mass centers of the two identified ROI. As seen in FIG. 5, the image registration function 110 estimates an angle between two straight lines L1 and L2. L1 represents the synthetic alignments and L2 represents the drifted line passing through the estimated mass centers of the extracted feature vectors from the sensor data.

The orientation of the sensor image may be approximated by the angular rotation of L1 from L2 and may be computed as follows:

$$\mathcal{R}_\theta/\theta = \arctan\left(\frac{\Delta d_y}{\omega - \Delta d_x}\right) \quad \text{(Equation 12)}$$

where $\omega$ is the predefined space between the two ROIs; $\Delta d_x = d_{x1} - d_{x2}$; and $\Delta d_y = d_{y1} - d_{y2}$. The angle $\theta$ may be approximated as $$\theta \approx \tan^{-1}\left(\frac{\Delta d_y}{\omega}\right).$$

The translational movement may be computed as $$\vec{\bar{d}}_{xy} = (\vec{d}_{xy1} + \vec{d}_{xy2})/2.$$

This approach for matching the extracted features is highly effective in stabilizing a range of key landmarks within the sensor raster image and its corresponding synthetic domain.

Figure 6:
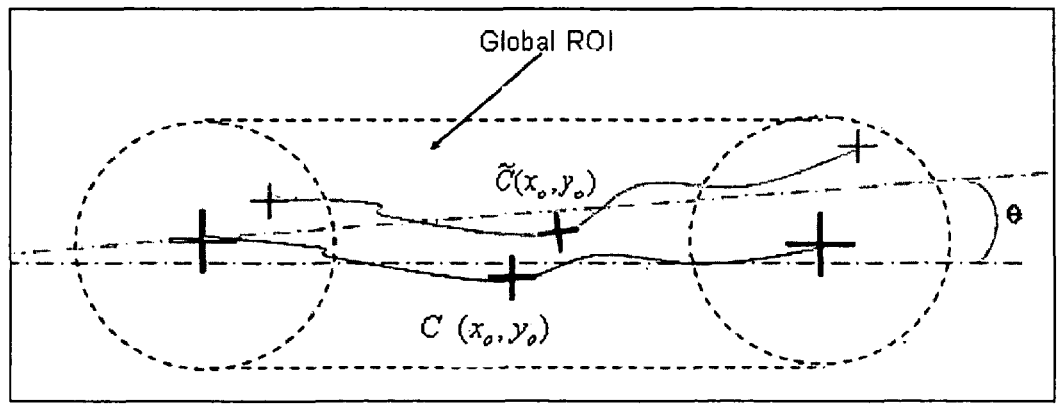

FIG. 6 shows another example of how the image registration function 110 may match the extracted features. In this example, the image registration function 110 uses a combinatory technique to model two ROI and the region in between the two ROI as a single feature vector. The image registration function 110 calculates a geometric transformation between the pair datasets of images, while a curve fitting model is exercised on the entire "in-between" region.

Each dataset is fitted into a straight-line curve that approximates its orientation. The displacement of the translational movement is estimated using the mass center of the newly combined ROI as shown in FIG. 6. To avoid the pitfalls of misaligning the edges of the curves, the image registration function 110 weighs the pixels at the edges higher than the pixels in between the edges when solving the minimization curve fitting problem. Thus, the rotation angle is estimated using the measured angle between the two fitted straight lines. This closed form solution avoids additional iterative minimization as the registration is conducted on extended ROI.

Figure 7:
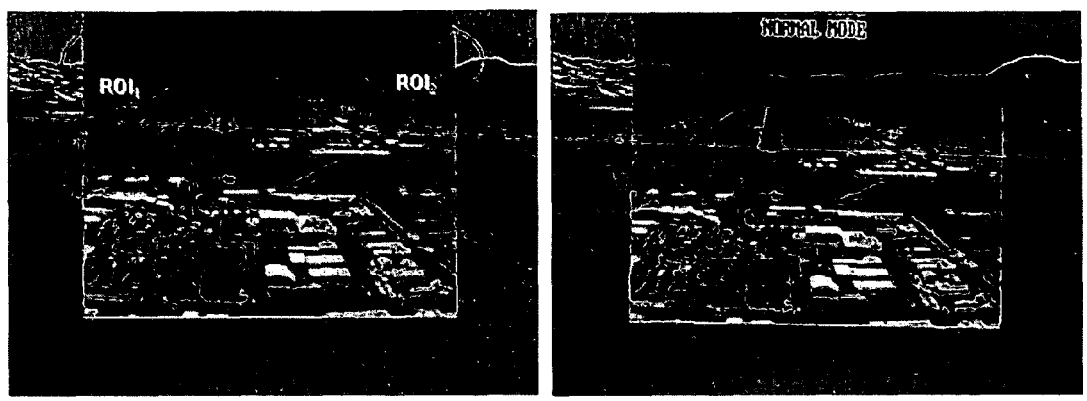
FIG. 7 is a screen shot depicting an image before and after image registration, according to an example.

The above described image registration approaches reliably stabilize the sensor images using horizon levels, and can be easily extended to track and recognize other types of landmarks, such as runway edges and sky-rise buildings. An example of an image before and after registration is shown in FIG. 7.

The method 200 may be performed on one or more ROI. For example, as a pilot is approaching a runway, one ROI may be the runway. Additional ROI may include the horizon, the airport terminal, and any large natural or manmade objects that the aircraft is expected to pass during approach. Additionally, each of the ROI may be weighted differently so as to provide emphasis. Using the example above, the runway may be given the highest priority, while objects that the aircraft will pass during approach are given less priority.

The output of the image registration function 110 is transferred to an image fusion function 114. The image fusion function 114 also receives data from the synthetic database 104 via the synthetic vision system 112. The image fusion function 114 generates pixel values based on a weighted average between the two image sources provides a linear superposition of the fused synthetic and sensor image. For example, the image fusion function 114 may use linear superposition to determine how much data to use from each image source. Additionally or alternatively, the vehicle operator may specify the amount of weight to be given to the sensor data versus the synthetic data for each ROI. For example, for the runway ROI, the image fusion function 114 and/or the pilot may select 80% synthetic and 20% sensor data. Preferably, the weights are normalized to provide the largest contrast possible In one example, the combination of synthetic and sensor data assumes that the sensor data is the most accurate reference of local displacement of objects in the images. If there is a discrepancy in the objects' displacements, the sensor data is assumed to reflect the actual measure. Thus, the combined output warps the pixel values of the synthetic data into the sensor reference, while using the synthetic domain to represent the global representation of the scene.

After combining the sensor data and the synthetic view into an integrated image, a symbology generator 116 may overlay symbology to the image to aid navigation. The symbology is designed to present information to the vehicle operator in a way that aids the operator's navigation of the vehicle. For example, if the vehicle is an aircraft, the symbology generator 116 may add flight instrument symbology to the image to simplify instrument flight. Overlaying symbology on an image is well-known in the art and the symbology generator 116 may use any appropriate method now known or developed in the future to overlay symbology on the fused sensor and synthetic image.

The resulting image may be provided in essentially real time on a display, such as a HUD, providing the vehicle operator with a 3D view of the external environment of the vehicle, despite the fact that actual viewing conditions may be limited. The display may help the vehicle operator to visualize landmarks as if visibility was not impacted by weather, environmental conditions, darkness, and/or other impediments. As a result, the vehicle operator may operate the vehicle in a safer manner than without the fused image.

It should be understood that the illustrated embodiments are examples only and should not be taken as limiting the scope of the present invention. The claims should not be read as limited to the described order or elements unless stated to that effect. Therefore, all embodiments that come within the scope and spirit of the following claims and equivalents thereto are claimed as the invention.

We claim:

1. A fusion method for combining sensor data with synthetic data to form an integrated image, comprising in combination:
    identifying at least two landmarks;
    extracting an image gradient from a sensor image dataset for only each of the at least two landmarks;
    extracting a corresponding image gradient from a synthetic image dataset for only each of the at least two landmarks, the synthetic image dataset representative of a three-dimensional synthetic image;
    calculating a center of mass for each of the image gradients extracted from the sensor and synthetic image datasets;
    calculating displacement between corresponding image gradients from the sensor and synthetic image datasets centered at the calculated centers of mass; and
    stabilizing images by minimizing the displacement to form the integrated image.

2. The method of claim 1, wherein calculating displacement includes calculating a displacement vector that represents space shifting and rotation between the corresponding extracted image gradients.

3. The method of claim 2, wherein calculating displacement includes estimating the rotation using a rotation matrix.

4. The method of claim 2, wherein calculating displacement includes estimating the rotation as an average of two rotation angles.

5. The method of claim 1, wherein calculating displacement includes estimating an orientation of an image as a function of a line that coincides on the centers of mass for the at least two landmarks.

6. The method of claim 1, wherein calculating displacement includes using a geometric transformation that is applied rigidly between the sensor and synthetic image datasets and a curve fitting model in a region between the at least two landmarks.

7. The method of claim 1, wherein stabilizing images includes minimizing a least mean square error between the centers of mass for corresponding image gradients.

8. The method of claim 1, wherein stabilizing images includes minimizing a least mean square error between corresponding image gradients.

9. A fusion method for combining sensor data with synthetic data to form an integrated image, comprising in combination:
    identifying at least two landmarks;
    extracting an image gradient from a sensor image dataset for only each of the at least two landmarks;
    reading a corresponding image synthetic edge from a synthetic image dataset for only each of the at least two landmarks, the synthetic image dataset representative of a three-dimensional synthetic image;
    calculating a center of mass for each of the extracted image gradients and corresponding synthetic edges;
    calculating displacement between corresponding image gradients and synthetic edges centered at the calculated centers of mass; and
    stabilizing images by minimizing the displacement to form the integrated image.

10. The method of claim 9, wherein calculating displacement includes calculating a displacement vector that represents space shifting and rotation between the extracted image gradient and the corresponding synthetic edge.

11. The method of claim 10, wherein calculating displacement includes estimating the rotation using a rotation matrix.

12. The method of claim 10, wherein calculating displacement includes estimating the rotation as an average of two rotation angles.

13. The method of claim 9, wherein calculating displacement includes estimating an orientation of an image as a function of a line that coincides on the centers of mass for the at least two landmarks.

14. The method of claim 9, wherein calculating displacement includes using a geometric transformation that is applied rigidly between the sensor and synthetic image datasets and a curve fitting model in a region between the at least two landmarks.

15. The method of claim 9, wherein stabilizing images includes minimizing a least mean square error between centers of mass for corresponding image gradients and synthetic edges.

16. The method of claim 9, wherein stabilizing images includes minimizing a least mean square error between corresponding image gradients and synthetic edges.

* * * * *